United States Patent [19]

Goto et al.

[11] Patent Number: 5,545,462
[45] Date of Patent: Aug. 13, 1996

[54] MAGNETIC RECORDING MEDIUM

[75] Inventors: Narito Goto, Hino; Masanori Isshiki, Yokohama; Kunitsuna Sasaki, Hino; Nobuyuki Sekiguchi, Hino; Katsuyuki Takeda, Hino; Hideki Takahashi, Hino, all of Japan

[73] Assignees: Konica Corporation, Japan; Kabushiki Kaisha Toshiba, Japan

[21] Appl. No.: 272,278

[22] Filed: Jul. 8, 1994

Related U.S. Application Data

[63] Continuation of Ser. No. 804,841, Dec. 6, 1991, abandoned.

[30] Foreign Application Priority Data

Dec. 12, 1990 [JP] Japan ..................... 2-401516

[51] Int. Cl.$^6$ ............... B32B 3/10; B32B 7/02; B32B 5/16; G11B 5/66
[52] U.S. Cl. ............ 428/141; 428/212; 428/323; 428/336; 428/694 B; 428/694 BR; 428/694 BG; 428/694 BA; 428/694 BH; 428/694 BM; 428/900
[58] Field of Search ................. 478/323, 336, 478/900, 141, 212, 694 B, 694 BR, 694 BG, 694 BA, 694 BH, 694 BM

[56] References Cited

U.S. PATENT DOCUMENTS

| | | | |
|---|---|---|---|
| 4,720,411 | 1/1988 | Shimozawa et al. | 428/141 |
| 4,743,487 | 5/1988 | Saito et al. | 428/141 |
| 4,911,951 | 3/1990 | Ogawa et al. | 427/130 |
| 5,051,292 | 9/1991 | Katoh et al. | 428/141 |
| 5,063,105 | 11/1991 | Ryoke et al. | 428/336 |
| 5,066,534 | 11/1991 | Goto et al. | 428/212 |

FOREIGN PATENT DOCUMENTS 373563  6/1990  European Pat. Off. ........ G11B 5/716

OTHER PUBLICATIONS

Patent Abstracts of Japan vol. 14, No. 512 (P–112); Nov. 9, 1990 JPA–2–214,019; Aug. 27, 1990.
Patent Abstracts of Japan vol. 15, No. 041 (P–116); Jan. 31, 1991, JPA–2–276,020.

*Primary Examiner*—Leszek Kiliman
*Attorney, Agent, or Firm*—Jordan B. Bierman; Bierman and Muserlian

[57] ABSTRACT

Disclosed is a magnetic recording medium characterized in that plural magnetic layers are provided on a non-magnetic support, the uppermost layer of the magnetic layers contains a ferromagnetic metallic powder and/or a hexagonal system magnetic powder and a binder, at least one layer other than the uppermost layer contains Co-containing iron oxide and a binder, the film thickness of the uppermost layer is 0.5 μm or less, and the surface of the uppermost layer of the magnetic layers has an $R_{10z}$ value of the magnetic layer defined below of 50 nm or less, by which electromagnetic conversion characteristics of a magnetic recording medium can be improved.

11 Claims, 1 Drawing Sheet

MAGNETIC RECORDING MEDIUM

This application is a continuation of application Ser. No. 0/8,804, filed Feb. 6, 1991, now abandoned.

BACKGROUND OF THE INVENTION

This invention relates to a magnetic recording medium, more particularly to a magnetic recording medium remarkably improved in both chroma/audio characteristics and video characteristics, and also excellent in durability.

In recent years, a magnetic recording medium such as a video tape has been demanded to be improved in electromagnetic conversion characteristics remarkably. However, techniques which can satisfy this demand sufficiently have not been known so far.

In the prior art, it has been known a technique that by dividing magnetic layers laminated on a non-magnetic support to an upper layer and a lower layer, and generally imparting video characteristics to the upper layer and chroma/audio characteristics to the lower layer, high electromagnetic conversion characteristics can be realized to the extent which cannot be achieved by a single layer tape. For example, there has been developed a magnetic recording medium in which transfer characteristics are improved or increase in light transmittance is suppressed by dividing magnetic layers laminated on a non-magnetic support to an upper layer and a lower layer, and incorporating a ferromagnetic alloy powder into the upper layer and a ferromagnetic powder into the lower layer.

However, sufficient chroma/audio characteristics cannot be obtained only by making the upper layer to have a film thickness of 1 μm, and also when the film thickness of the upper layer is made 0.5 μm or less, there is a problem that video characteristics tend to be lowered.

On the other hand, in a magnetic recording medium, not only improvement in electromagnetic conversion characteristics but also improvement in running durability have been demanded.

As a magnetic recording medium which can satisfy both demands, in Japanese Provisional Patent Publication No. 168124/1986, there is disclosed an attempt to improve electromagnetic conversion characteristics and running property at the same time by regulating a surface state of a magnetic layer of a magnetic recording medium by Ra which is an average roughness of a center line (defined in JIS B0601 (1976)) and $R_{max}$ which is a maximum height of unevenness of a surface. However, the techniques disclosed in the above patent publication cannot improve electromagnetic conversion characteristics and running property remarkably, and also it cannot reduce a rubbing noise effectively.

SUMMARY OF THE INVENTION

The present invention has been made under the above situations. That is, an object of the present invention is to provide a magnetic recording medium remarkably improved in both chroma/audio characteristics and video characteristics, and also excellent in durability.

The present inventors have found that sufficient improvement in chroma/audio characteristics, particularly chroma S/N can be achieved only when an upper layer film thickness is made 0.5 μm or less, and above all, when an upper layer film thickness is made 0.1 to 0.4 μm, great improvement of chroma S/N can be achieved.

Further, the present inventors have found that video characteristics are lowered merely by making an upper layer film thickness 0.5 μm or less, and therefore, it is indispensable to make $R_{10z}$ which is a new parameter regulating a surface of a magnetic layer, 50 nm or less, preferably 5 to 20 nm, in order to obtain both video characteristics and chroma/audio characteristics with high level, to accomplish the present invention. It has been also found that running durability is improved remarkably when such conditions are satisfied.

The present invention has been completed based on the above findings.

That is, a first invention for accomplishing the above object is a magnetic recording medium characterized in that plural magnetic layers are provided on a non-magnetic support, the uppermost layer of the magnetic layers contains a ferromagnetic metallic powder and/or a hexagonal system magnetic powder, at least one magnetic layer other than the uppermost layer contains Co-containing iron oxide, the film thickness of the uppermost layer is 0.5 μm or less, and the surface of the uppermost layer of the magnetic layers has an $R_{10z}$ value of the magnetic layer defined below of 50 nm or less.

A second invention is the magnetic recording medium described above in which the film thickness of the above uppermost layer is 0.1 to 0.4 μm.

Here, $R_{10z}$ refers to a value obtained by measuring, in a longitudinal magnification direction of a surface outline curve, a distance between two straight lines which are a line passing the 10th peak from the highest and a line passing the 10th ravine from the lowest selected from lines parallel to a horizontal line cutting an upper surface outline curve (contour line) at a cut surface, when a magnetic recording medium is cut to a longer direction vertically within an area of ±2 mm from the middle point of a width direction with a standard length.

DESCRIPTION OF THE PREFERRED EMBODIMENTS

In the following, the present invention is explained in detail.

The magnetic recording medium of the present invention is a magnetic recording medium having plural magnetic layers on a non-magnetic support, having the uppermost layer and layers other than the uppermost layer containing specific magnetic particles, respectively, having a surface with a specific surface roughness, and having a specific film thickness.

Layer constitution

The magnetic recording medium of the present invention basically consists of two or more magnetic layers laminated on the surface of a non-magnetic support.

On the surface (back surface) of the non-magnetic support on which the above magnetic layers are not provided, a back coat layer is preferably provided for the purposes of improving running property, and preventing static charge and transfer of the magnetic recording medium. Further, a subbing layer may be provided between the magnetic layer and the non-magnetic support.

Non-magnetic support

As a material for forming the above non-magnetic support, there may be mentioned, for example, polyesters such as polyethylene terephthalate and polyethylene-2,6-naphthalate; polyolefins such as polypropylene; cellulose derivatives such as cellulose triacetate and cellulose diacetate; and plastics such as polyamide and polycarbonate.

The shape of the above non-magnetic support is not particularly limited, and may mainly have a shape such as a tape, a film, a sheet, a card, a disc and a drum.

The thickness of the non-magnetic support is not particularly limited. However, in the case of a film or sheet shape, the thickness is generally 3 to 100 μm, preferably 5 to 50 μm, in the case of a disc or card shape, it is generally about 30 μm to 10 nm, and in the case of a drum shape, it may be selected suitably depending on a recorder.

The non-magnetic support may be a single layer structure or a multilayer structure.

Further, the non-magnetic support may be the one to which surface treatment such as corona discharging treatment has been applied.

Magnetic layer

The above respective magnetic layers basically consist of magnetic powders dispersed in a binder resin.

In the present invention, it is important that the uppermost layer of the magnetic layers contains a ferromagnetic metallic powder and/or a hexagonal system magnetic powder, and at least one magnetic layer other than the uppermost layer contains Co-containing iron oxide.

Further, it is important that the film thickness of the uppermost layer is 0.5 μm or less, preferably 0.1 to 0.4 μm, and the surface of the uppermost layer of the magnetic layers should be an $R_{10z}$ value of the magnetic layer defined above being 50 nm or less, preferably 5 to 20 nm.

By satisfying these conditions, electromagnetic conversion characteristics of the magnetic recording medium of the present invention can be improved.

To the contrary, when any one of the above conditions is not satisfied, the effect of the present invention cannot be obtained.

For making the surface of the magnetic layer to have a specific roughness as described above, conditions of calendar may be particularly controlled as described below.

Of the plural magnetic layers of the present invention, the uppermost layer contains a ferromagnetic metallic powder and/or a hexagonal system magnetic powder.

As the ferromagnetic metallic powder to be used in the uppermost layer, there may be mentioned ferromagnetic metallic powders such as Fe and Co powders, Fe—Al type, Fe—Al—Ni type, Fe—Al—Zn type, Fe—Al—Co type, Fe—Al—Ca type, Fe—Ni type, Fe—Ni—Al type, Fe—Ni—Co type, Fe—Ni—Si—Al—Mn type, Fe—Ni—Si—Al—Zn type, Fe—Al—Si type, Fe—Ni—Zn type, Fe—Ni—Mn type, Fe—Ni—Si type, Fe—Mn—Zn type, Fe—Co—Ni—P type and Ni—Co type powders, and metallic magnetic powders mainly composed of Fe, Ni and Co. Among them, Fe type metallic powders are excellent in electrical characteristics.

On the other hand, from the standpoints of corrosion resistance and dispersibility, preferred are metallic powders of Fe type including Fe—Al type, Fe—Al—Ca type, Fe—Al—Ni type, Fe—Al—Zn type, Fe—Al—Co type, Fe—Ni type, Fe—Ni—Zn type, Fe—Ni—Si—Al—Zn type, Fe—Ni—Si—Al—Mn type and Fe—Ni—Co type.

The ferromagnetic metallic powder particularly preferred for the object of the present invention is a metallic magnetic powder mainly composed of iron, desirably containing Al in a weight ratio of Fe:Al=100:0.5 to 100:20, and Ca in a weight ratio of Fe:Ca= 100:0.1 to 100:10.

By setting the ratio of Fe:Al to such a range, corrosion resistance can be improved remarkably, and by setting the ratio of Fe:Ca to such a range, electromagnetic conversion characteristics can be improved and also drop out can be reduced.

The reason why improvement in electromagnetic conversion characteristics and reduction of drop out are brought about has not been clarified. However, increase in coersive force and decrease in an amount of agglomerates caused by improvement in dispersibility may be considered to be reasons therefor.

The ferromagnetic metallic powder to be used in the present invention preferably has an average long axis length of less than 0.25 μm, particularly 0.10 to 0.22 μm, and a crystal size of less than 200 Å, particularly 100 to 180 Å. When the average long axis length and the crystal size of the ferromagnetic metallic powder are within the above ranges, electromagnetic conversion characteristics can be further improved.

The ferromagnetic metallic powder to be used in the present invention generally preferably has a coercive force (Hc) in the range of 600 to 5,000 Oe.

If the coercive force is less than 600 Oe, electromagnetic conversion characteristics may be sometimes lowered, while if the coercive force exceeds 5,000 Oe, recording may not be conducted with a common head undesirably.

The above ferromagnetic powder generally preferably has a saturation magnetization amount ($\sigma_s$) which is a magnetic characteristic of 70 emu/g or more.

If the saturation magnetization amount is less than 70 emu/g, electromagnetic conversion characteristics may be lowered.

Further, in the present invention, in order to cope with higher density of recording, there may be preferably used a ferromagnetic metallic powder having a specific surface area according to the BET method of 45 m²/g or more (BET is described below).

As a preferred specific example of the ferromagnetic metallic powder to be used in the present invention, there may be mentioned an Fe—Al type ferromagnetic metallic powder (weight ratio of Fe:Al=100:5, average long axis length: 0.16 μm, Hc: 1,580 Oe and $\sigma_s$: 120 emu/g).

Further, in the uppermost layer of the magnetic layers of the magnetic recording medium of the present invention, a hexagonal system magnetic powder may be used.

As the hexagonal system magnetic powder, there may be mentioned, for example, hexagonal ferrite.

Such hexagonal ferrite consists of barium ferrite or strontium ferrite, and a part of iron element may be substituted by other elements (e.g. Ti, Co, Zn, In, .Mn, Ge and Nb). The ferrite magnetic material is described in detail in IEEE Trans. on MAG-18 16 (1982).

In the present invention, as a particularly preferred hexagonal system magnetic powder, there may be mentioned a barium ferrite (hereinafter referred to as Ba-ferrite) magnetic powder.

The preferred Ba-ferrite magnetic powder which can be used in the present invention is Ba-ferrite in which a part of Fe's is substituted by at least Co and Zn, having an average particle diameter (tabular diameter) of 300 to 900 Å, a particle aspect ratio (diameter/thickness) of 2.0 to 10.0, preferably 2.0 to 6.0 and a coercive force (Hc) of 350 to 2,000 Oe, preferably 450 to 1,500 Oe.

In the Ba-ferrite powder, the coercive force is controlled to be a suitable value by partially substituting Fe by Co, and further, by partially substituting Fe by Zn, high saturation magnetization can be realized to the extent which cannot be achieved only by Co substitution, whereby a magnetic recording medium having high reproduction output and excellent in electromagnetic conversion characteristics can be obtained. Further by partially substituting Fe by Nb, a magnetic recording medium having higher reproduction output and more excellent in electromagnetic conversion characteristics can be obtained. Also, in the Ba-ferrite to be used in the present invention, a part of Fe's may be further substituted by a transition metal such as Ti, In, Mn, Cu, Ge and Sn without any problem.

When the Ba-ferrite to be used in the present invention is represented by the following formula wherein M is a substituting metal:

$$BaO \cdot n(Fe_{1-m}M_m)_2O_3)$$

(wherein m>0.36, but Co+Zn=0.08 to 0.3, Co/Zn=0.5 to 10),
preferred is a magnetic particle in which n is 5.4 to 11.0, preferably 5.4 to 6.0 and M is a combination of two or more elements of which each average number is 3.

In the present invention, the reason why it is preferred that the average particle diameter, particle aspect ratio and coercive force of the Ba-ferrite are within the above preferred ranges is described below. That is, if the average particle diameter is less than 300 Å, the reproduction output of the magnetic recording medium becomes insufficient, while if it exceeds 900 Å, the surface smoothness of the magnetic recording medium is extremely worsened and a noise level sometimes becomes too high. If the particle aspect ratio is less than 2.0, perpendicular orientation rate suitable for high density recording of the magnetic recording medium cannot be obtained, while if the particle aspect ratio exceeds 10.0, the surface smoothness of the magnetic recording medium is extremely worsened and a noise level becomes too high. Further, if the coercive force is less than 350 Oe, it becomes difficult to maintain recorded signals, while if it exceeds 2,000 Oe, a saturated phenomenon of head limit occurs, whereby it may be difficult to conduct recording.

The hexagonal system magnetic powder to be used in the present invention generally desirably has a saturation magnetization amount ($\sigma_s$) which is a magnetic characteristic of 60 emu/g or more.

If the saturation magnetization amount is less than 60 emu/g, electromagnetic conversion characteristics may be lowered.

Further, in the present invention, to cope with higher density of recording, a hexagonal system magnetic powder having a specific surface area according to the BET method of 30 m²/g or more, preferably 45 m²/g or more, is desirably used (BET is described below).

As one specific preferred example of the Ba-ferrite to be used in the present invention, there may be mentioned a Co—Zn substituted Ba-ferrite (Hc:1,100 Oe, BET: 45 m²/g, $\sigma_s$: 64 emu/g, particle aspect ratio: 4).

As a method for preparing the hexagonal magnetic powder to be used in the present invention, there may be used suitably, for example, a glass crystallization method in which oxides and carbonates of the respective elements necessary for forming a desired Ba-ferrite is melted with a glass-forming substance such as, for example, boric acid, the resulting melt is quenched to form a glass, the glass is subjected to heat treatment at a predetermined temperature to precipitate a crystalline powder of the desired Ba-ferrite, and finally a glass component is removed by heat treatment, and also a coprecipitation-sintering method, a hydrothermal synthetic method, a flux method, an alkoxide method and a plasma jet method.

In the present invention, the ferromagnetic metallic powder and the hexagonal system magnetic powder may be used in combination.

In the magnetic layers other than the above uppermost layer, any desired magnetic material known in the field of a magnetic recording medium may be contained.

As a magnetic powder to be contained in the magnetic layers other than the above uppermost layer, there may be mentioned, for example, a magnetic material of an oxide such as $\gamma$-$Fe_2O_3$, Co-doped $\gamma$-$Fe_2O_3$, Co-adsorbed $\gamma$-$Fe_2O_3$, $Fe_3O_4$, Co-doped $Fe_3O_4$, Co-adsorbed $Fe_3O_4$, Co-adsorbed magnetic $FeO_x$ (4/3 <x<3/2) and $CrO_2$.

The hexagonal ferrite such as barium ferrite described above, iron nitride, iron carbide and a ferromagnetic metallic powder may be also used.

Among them, the magnetic powder to be contained in the magnetic layers other than the above uppermost layer, which is preferred in the magnetic recording medium of the present invention, is a Co-adsorbed magnetic $FeO_x$ (4/3 <x<3/2) powder.

The important point in the present invention resides in that Co-containing magnetic iron oxide, preferably Co-adsorbed $FeO_x$ (4/3 < x<3/2), is contained in at least one layer of the magnetic layers other than the uppermost layer.

In the present invention, as a specific example preferably used in the magnetic layers other than the uppermost layer, there may be mentioned Co-adsorbed $\gamma$-$Fe_2O_3$(Hc: 800 Oe, BET value: 50 m²/g (BET is described below.)). In the present invention, in order to cope with higher density of recording, a ferromagnetic powder having a specific surface area according to the BET method of 45 m²/g or more is preferably used.

The specific surface area of the ferromagnetic powder (including the ferromagnetic metallic powder) in the present invention is a value represented by a square meter per unit gram of a surface area measured by a method of measuring a specific surface area, which is called the BET method.

The specific surface area and the method for measuring the same are described in detail in "Measurement of Powder" (written by J. M. Dallavelle and Clyeorr Jr., translated by Muta et al., published by Sangyo Tosho Co.), and also described in "Chemical Handbook" Application Volume, pp. 1170 to 1171 (edited by Nihon Kagakukai, published by Maruzen K. K. on Apr. 30, 1966).

For measuring the specific surface area, for example, a powder is deaerated while heating at about 105° C. for 13 minutes to remove substances absorbed to the powder, then the powder is introduced into a measuring instrument and the initial pressure of nitrogen is set to be 0. 5 kg/m²and measurement was carried out using nitrogen at a liquid nitrogen temperature of −105° C. for 10 minutes.

As the measuring instrument, for example, Quanta-sorb (trade name, manufactured by Yuasa Ionics K.K.) is used.
Binder As a binder to be used in the present invention, there may be mentioned polyurethane, polyester and a vinyl chloride type resin such as a vinyl chloride type copolymer as representative ones. These resins preferably contain a recurring unit having at least one polar group selected from —$SO_3M$, —$OSO_3M$, —COOM and —$PO(OM^1)_2$.

In the above polar groups, M represents hydrogen atom or an alkali metal such as Na, K and Li, and $M^1$ represents hydrogen atom, an alkali atom such as Na, K and Li or an alkyl group.

The above polar groups have action of improving dispersibility of a ferromagnetic powder, and each content in the resin is 0.1 to 8.0 mole %, preferably 0.5 to 6.0 mole %. If the content is less than 0.1 mole %, the dispersibility of the ferromagnetic powder is lowered, while if the content exceeds 8.0 mole %, a magnetic coating is liable to gel. The weight average molecular weight of each resin described above is preferably in the range of 15,000 to 50,000.

The content of the binder in the magnetic layer is generally 10 to 40 parts by weight, preferably 15 to 30 parts by weight per 100 parts by weight of the ferromagnetic powder.

The binders may be used not only singly but also in combination of two or more of them. When used in combination, the weight ratio of polyurethane and/or polyester to a vinyl chloride type resin is generally 90:10 to 10:90, preferably in the range of 70:30 to 30:70.

The vinyl chloride type copolymer containing a polar group to be used as a binder in the present invention can be synthesized by, for example, addition reaction of a copolymer having hydroxyl group such as a vinyl chloride-vinyl alcohol copolymer with one of the following compounds having a polar group and chlorine atom.

By selecting $ClCH_2CH_2SO_3Na$ as an example from these compounds, the above reaction can be explained as shown below.

The vinyl chloride type copolymer containing a polar group can be synthesized by charging a predetermined amount of a reactive monomer having an unsaturated bond into which a recurring unit including a polar unit is introduced into a reaction vessel such as an autoclave, and effecting polymerization reaction by using a common polymerization initiator, for example, a radical polymerization initiator such as BPO (benzoyl peroxide) and AIBN (azobisisobutyronitrile), a redox polymerization initiator or a cationic polymerization initiator.

As a specific example of the reactive monomer for introducing sulfonic acid or a salt thereof, there may be mentioned unsaturated hydrocarbon sulfonic acids such as vinylsulfonic acid, allylsulfonic acid, methacrylsulfonic acid and p-styrenesulfonic acid, and salts thereof.

For introducing carboxylic acid or a salt thereof, for example, (meth) acrylic acid or maleic acid may be used, and for introducing phosphoric acid or a salt thereof, for example, (meth)acrylic acid-2-phosphate may be used.

An vinyl chloride type copolymer to which an epoxy group is introduced is preferred.

This is because the polymer is improved in thermal stability.

When the epoxy group is introduced, the content of the recurring unit having the epoxy group in the copolymer is preferably 1 to 30 mole %, more preferably 1 to 20 mole %.

The monomer for introducing the epoxy group is preferably, for example, glycidyl (meth) acrylate.

The techniques of introducing the polar group into the vinyl chloride type copolymer are described in Japanese Provisional Patent Publications No. 44227/1982, No. 108052/ 1983, No. 8127/1984, No. 101161/1985, No. 235814/1985, No. 238306/1985, No. 238371/1985, No. 121923/1987, No. 146432/ 1987 and No. 146433/1987, and these techniques can be utilized also in the present invention.

Next, the syntheses of polyester and polyurethane to be used in the present invention are described.

In general, polyester can be obtained by reacting a polyol with a polybasic acid.

By utilizing this known method, polyester (polyol) having a polar group can be synthesized from polyol and a polybasic acid partially having a polar group.

As an example of the polybasic acid having a polar group, there may be mentioned 5-sulfoisophthalic acid, 2-sulfoisophthalic acid, 4-sulfoisophthalic acid, 3-sulfophthalic acid, dialkyl 5-sulfoisophthalate, dialkyl 2-sulfoisophthalate, dialkyl 4-sulfoisophthalate and dialkyl 3-sulfoisophthalate, and sodium salts or potassium salts of these.

As an example of the polyol, there may be mentioned trimethylolpropane, hexanetriol, glycerin, trimethylolethane, neopentyl glycol, pentaerythritol, ethylene glycol, propylene glycol, 1,3-butanediol, 1,4-butanediol, 1,6-hexanediol, diethylene glycol and cyclohexanedimethanol.

The polyesters into which other polar groups are introduced can be also synthesized according to the known method.

Next, polyurethane is described.

Polyurethane is obtained by reacting a polyol with a polyisocyanate.

As the polyol, there may be generally used a polyester polyol obtained by reacting a polyol with a polybasic acid.

Thus, by utilizing a polyester polyol having a polar group as a starting material, a polyurethane having a polar group can be synthesized.

As an example of the polyisocyanate, there may be mentioned diphenylmethane-4,4'-diisocyanate (MDI), hexamethylene diisocyanate (HMDI), tolylene diisocyanate (TDI), 1,5-naphthalene diisocyanate (NDI), tolidine diisocyanate (TODI) and lysine isocyanate methyl ester (LDI).

As another method of synthesizing polyurethane having a polar group, addition reaction of polyurethane having hydroxyl group with one of the following compounds having a polar group and chlorine atom is also effective.

wherein M and $M^1$ have the same meanings as defined above.

The techniques of introducing a polar group into polyurethane are described in Japanese Patent Publication No. 41565/1983, and Japanese Provisional Patent Publications No. 92422/1982, No. 92423/1982, No. 8127/1984, No. 5423/ 1984, No. 5424/1984 and No. 121923/1987, and these techniques can be also used in the present invention.

In the present invention, the following resins may be used in combination as a binder in an amount of 20% by weight or less based on all binders.

Such a resin may include a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, polyvinyl butyral, a cellulose derivative (such as nitrocellulose), a styrene-butadiene copolymer, various kinds of synthetic rubber type resins, a phenol resin, an epoxy resin, a urea resin, a melamine resin, a phenoxy resin, a silicone resin, an acrylic resin and an urea formamide resin each having a weight average molecular weight of 10,000 to 200,000.

Other components

In the present invention, for improving durability of the magnetic layer, polyisocyanate is preferably contained in the magnetic layer.

As the polyisocyanate, there may be included for example, an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound.

The weight average molecular weight of the polyisocyanate is desirably in the range of 100 to 3,000.

In the present invention, depending on the necessity, an additive such as a dispersing agent, a lubricant, an abrasive, an antistatic agent and a filler may be contained in the magnetic layer.

First, as the dispersing agent, there may be mentioned an fatty acid having 12 to 18 carbon atoms such as caprylic acid, capric acid, lauric acid, myristic acid, palmitic acid, stearic acid and oleic acid; alkali metal salts or alkaline earth metal salts of these or amides thereof; polyalkylene oxide alkylphosphate; lecithin; trialkylpolyolefinoxy quaternary ammonium salt; an azo type compound having carboxyl group and/or an sulfonic acid group.

These dispersing agents are generally used in the range of 0.5 to 5% by weight based on the ferromagnetic powder.

Next, as the lubricant, there may be used fatty acid and/or fatty acid ester.

In this case, the amount of the fatty acid to be added is preferably 0.2 to 10% by weight, preferably 0.5 to 5% by weight based on the ferromagnetic powder.

If the amount added is less than 0.2% by weight, running property is liable to be lowered, while if it exceeds 10% by weight, the fatty acid may exude to the surface of the magnetic layer, and the output is liable to be lowered.

The amount of the fatty acid ester to be added is also preferably 0.2 to 10% by weight, more preferably 0.5 to 5 by weight based on the ferromagnetic powder.

If the amount added is less than 0.2% by weight, still-flame durability is liable to be lowered, while if it exceeds 10% by weight, the fatty acid ester may exude to the surface of the magnetic layer, and the output is liable to be lowered.

For further enhancing lubricating effect by using the fatty acid and the fatty acid ester in combination, the weight ratio of the fatty acid to the fatty acid ester is preferably 10:90 to 90:10.

The fatty acid may be either a monobasic acid or a dibasic acid, and preferably has 6 to 30 carbon atoms, more preferably in the range of 12 to 22 carbon atoms.

As a specific example of the fatty acid, there may be mentioned caprole acid, caprylic acid, capric acid, lauric acid, myristic acid, palmitic acid, stearic acid, isostearic acid, linolenic acid, oleic acid, elaidic acid, behenic acid, malonic acid, succinic acid, maleic acid, glutaric acid, adipic acid, pimelic acid, azelaic acid, sebacic acid, 1, 12-dodecanedicarboxylic acid and octanedicarboxylic acid.

As a specific example of the fatty acid ester, there may be mentioned oleyl oleate, isocetyl stearate, dioleyl malate, butyl stearate, butyl palmitate, butyl myristate, octyl myristate, octyl palmitate, pentyl stearate, pentyl palmitate, isobutyl oleate, stearyl stearate, lauryl oleate, octyl oleate, isobutyl oleate, ethyl oleate, isotridecyl oleate, 2-ethylhexyl stearate, 2-ethylhexyl palmitate, isopropyl palmitate, isopropyl myristate, butyl laurate, cetyl-2-ethyl hexalate, dioleyl adipate, diethyl adipate, diisobutyl adipate, diisodecyl adipate, oleyl stearate, 2-ethylhexyl myristate, isopentyl palmitate, isopentyl stearate, diethylene glycol monobutyl ether palmitate and diethylene glycol monobutyl ether palmitate.

As the lubricant other than the fatty acid and fatty acid ester described above, there may be used, for example, silicone oil, graphite, fluorinated carbon, molybdenum disulfide, tungsten disulfide, fatty amide and α-olefin oxide.

Next, as a specific example of the abrasive, there may be mentioned s-alumina, melted alumina, chromium oxide, titanium oxide, α-iron oxide, silicon oxide, silicon nitride, tungsten carbide, molybdenum carbide, boron carbide, corumdum, zinc oxide, cerium oxide, magnesium oxide and boron nitride.

The average particle size of the abrasive is preferably 0.05 to 0.6 μm, more preferably 0.1 to 0.3 μm.

Next, as the antistatic agent, there may be mentioned a conductive powder such as carbon black and graphite; a cationic surfactant such as quaternary amine; an anionic surfactant containing an acid group such as sulfonic acid, sulfuric acid, phosphoric acid, phosphate and carboxylic acid; an amphoteric surfactant such as aminosulfonic acid; and a natural surfactant such as saponin.

The above antistatic agent is generally added in an amount of 0.01 to 40 % by weight based on the binder.

Preparation of magnetic recording medium

The method for preparing the magnetic recording medium of the present invention is not particularly limited, and it can be prepared according to a known method used for preparing a magnetic recording medium having a single layer structure or a plural layer structure.

In general, after preparing a magnetic coating by kneading and dispersing a ferromagnetic powder, a binder, a dispersing agent, a lubricant, an abrasive and an antistatic agent in a solvent, the magnetic coating is coated on the surface of a non-magnetic support.

As the above solvent, there may be used, for example, ketones such as acetone, methyl ethyl ketone (MEK), methyl isobutyl ketone (MIBK) and cyclohexanone; alcohols such as methanol, ethanol and propanol; esters such as methyl acetate, ethyl acetate and butyl acetate; cyclic ethers such as tetrahydrofuran; and halogenated hydrocarbons such as methylene chloride, ethylene chloride, carbon tetrachloride, chloroform and dichlorobenzene.

For kneading and dispersing the magnetic layer-forming components, various kinds of kneading and dispersing machines may be used.

As the kneading and dispersing machine, there may be mentioned, for example, a two-roll mill, a three-roll mill, a ball mill, a pebble mill, a co-ball mill, a tron mill, a sand mill, a sand grinder, a Sqegvari attritor, a high-speed impeller dispersing machine, a high-speed stone mill, a high speed impact mill, a disper, a high-speed mixer, a homogenizer, an ultrasonic dispersing machine, an open kneader, a continuous kneader and a pressurized kneader.

Among the above kneading and dispersing machines, a dispersion mixer which can give a consumed power load of 0.05 to 0.5 KW (per 1Kg of the magnetic powder) is a pressurized kneader, an open kneader, a continuous kneader, a two-roll mill and a three-roll mill.

For providing the magnetic layer onto the non-magnetic support to prepare the magnetic recording medium of the present invention, it is preferred to carry out simultaneous double layered coating according to the wet-on-wet double layered coating system particularly in view of the effect.

Figure 1:
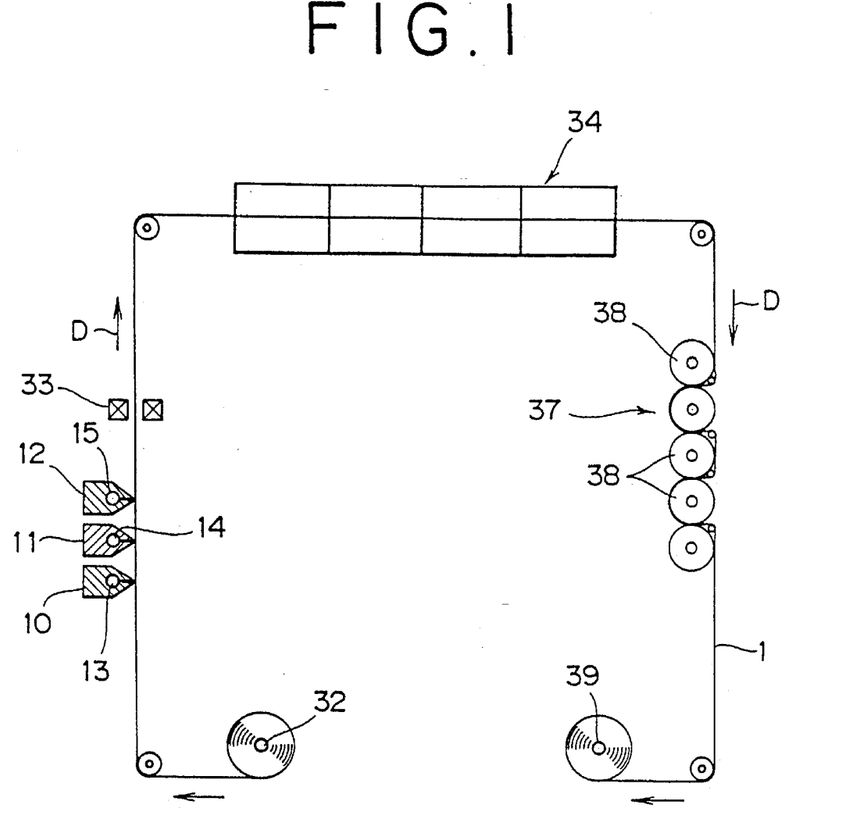
FIG. 1 is a view illustrating a method for preparing a magnetic recording medium according to a wet-on-wet system.

That is, as shown in FIG. 1, a film-shaped non-magnetic support 1 drawn out from a supply roll 32 is coated superposingly with the respective coatings for magnetic layers 2 and 4 by using extrusion coaters 10, 11 and 12 of an extrusion system according to the, wet-on-wet system, passed between a pair of magnets for orientation or magnets for perpendicular orientation 33, introduced into a dryer 34, and dried by blowing hot air from nozzles arranged at an upper part and a lower part of the dryer 34. Subsequently, the support 1 having the respective dried coating layers is introduced into a supercalender means 37 consisting of a combination of calender rolls 38's and calendered therewith, and then wound up round a wind roll 39. The magnetic film thus obtained is cut into a tape with a predetermined width to prepare, for example, an 8 mm video tape.

In the above method, the respective coatings may be supplied into the extrusion coaters 10, 11 and 12 through an inline mixer not shown. In the figure, an arrow D shows a direction of conveying the non-magnetic support (base film) 1. In the extrusion coaters 10, 11 and 12, liquid wells 13, 14 and 15 are provided, and the coatings from the respective coaters are superposed according to the wet-on-wet system. Thus, immediately after the coating for the lower magnetic layer is coated (while it is wet), the coating for the upper magnetic layer is coated superposingly.

In the wet-on-wet double layered coating method, a combination of a reverse roll and an extrusion coater, and a combination of a gravure roll and an extrusion coater may be also used. Further, an air doctor coater, a blade coater, an air knife coater, a squeeze coater, an impragnating coater, a transfer roll coater, a kiss coater, a cast coater and a spray coater may be also used in combination.

In the double layered coating according to the wet-on-wet system, the upper magnetic layer is coated while the lower magnetic layer is wet, so that the surface of the lower layer (namely, the boundary surface between the upper and lower layers) becomes smooth, the surface property of the upper layer becomes good, and also the adhesiveness between the upper and lower layers is improved. As a result, properties such as high output and low noise for high density recording required as a magnetic tape can be satisfied, and also for requirement of high durability, peel-off of the film does not occur and film strength is improved whereby durability is satisfied sufficiently. Further, by the wet- on-wet double layered coating system, drop out can be reduced to enhance reliability.

As a solvent to be incorporated into the above coating or a diluting solvent to be used at the time of coating of the above coating, there may be used ketones such as acetone, methyl ethyl ketone, methyl isobutyl ketone and cyclohexanone; alcohols such as methanol, ethanol, propanol and butanol; esters such as methyl acetate, ethyl acetate, butyl acetate, ethyl lactate and ethylene glycol monoacetate; ethers such as ethylene glycol dimethyl ether, ethylene glycol monoethyl ether, dioxane and tetrahydrofuran; aromatic hydrocarbons such as benzene, toluene and xylene; and halogenated hydrocarbons such as methylene chloride, ethylene chloride, carbon tetrachloride, chloroform and dichlorobenzene.

These various solvents may be used singly or may be used in combination of two or more.

The magnetic field in the above magnet for orientation or magnet for perpendicular orientation is about 20 to 5,000 gauss. The drying temperature in the dryer is about 30 to 120° C. The drying time is about 0.1 to 10 minutes.

Next, a surface smoothing treatment is carried out by calendering.

Subsequently, the film is subjected to slitting by effecting a burnishing processing or a blade processing depending on the necessity.

At that time, the above surface smoothing treatment is effective for achieving the object of the present invention.

That is, as described above, one of the requirements indispensable in the present invention is a condition of roughness of the magnetic layer surface, and for satisfying the condition, the above surface smoothing treatment is effective.

In the surface smoothing treatment, the calender conditions are temperature, linear pressure and C/s (coating rate). For achieving the object of the present invention, the above temperature is generally preferably maintained at 50 to 120° C., the above linear pressure 50 to 400 kg/cm, and the above C/s 20 to 600 m/min.

If these values are outside the above ranges, it may be difficult or impossible to specify the surface condition of the magnetic layer as in the present invention.

Figure 2:
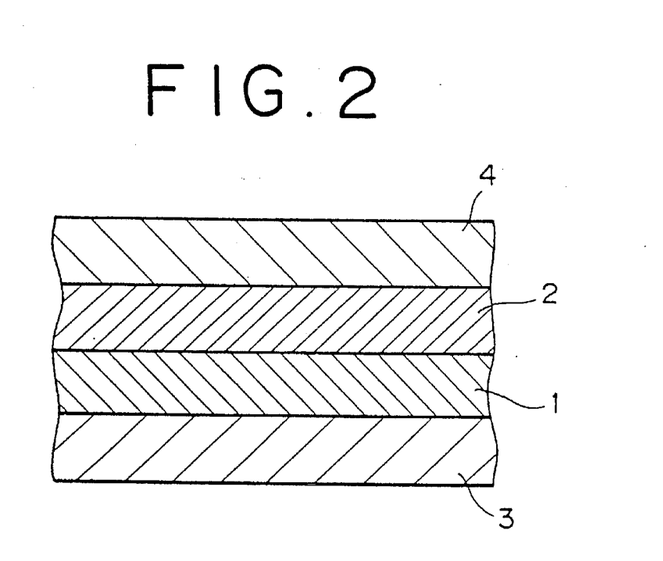
FIG. 2 is a schematic sectional view showing one example of the magnetic recording medium.

In the magnetic recording medium of the present invention thus obtained, for example, as shown in FIG. 2, the lower magnetic layer 2 and the uppermost magnetic layer 4 are laminated on the non-magnetic support 1, and the back coat layer 3 is formed on the back surface of the non-magnetic support 1. Thus, the magnetic recording medium has high electromagnetic conversion characteristics and high running durability, and therefore it can be used suitably as a video tape.

EXAMPLE

In the following, Examples of the present invention are described.

The components, rates and operation orders mentioned below can be modified variously within the range which does not deviate from the scope of the present invention. "Part" in the following Examples is part by weight in all cases.

Example 1

The respective components of a magnetic composition for an upper layer were kneaded and dispersed by using a kneader and a sand mill to prepare a magnetic coating for the upper layer.

(Magnetic coating for upper layer)

| | |
|---|---|
| Fe-Al type ferromagnetic metallic powder (weight ratio of Fe:Al = 100:5, average long axis length: 0.16 μm, Hc: 1,580 Oe, $\sigma_s$: 120 emu/g, crystal size: 170 Å, BET value: 55 m$^2$/g) | 100 parts |
| Vinyl chloride type resin containing polar group (sulfo group) (MR-110, trade name, produced by Nihon Zeon K.K.) | 10 parts |
| Polyurethane resin containing polar group (sulfo group) (UR-8700, trade name, produced by Toyobo K.K.) | 5 parts |
| Stearic acid | 1 part |
| Myristic acid | 1 part |
| Butyl stearate | 1 part |
| Alumina (Al$_2$O$_3$) | 6 parts |
| Carbon black (average particle size: 40 mμ) | 0.8 part |
| Cyclohexanone | 150 parts |
| Methyl ethyl ketone | 50 parts |
| Toluene | 50 parts |

Next, a magnetic coating for a lower layer was prepared by using the same composition as the above magnetic composition for the upper layer except for using a Co-adsorbed γ-Fe$_2$O$_3$ powder in place of the Fe—Al type ferromagnetic metallic powder.

(Magnetic coating for lower layer)

| | |
|---|---|
| Co-adsorbed γ-Fe$_2$O$_3$ powder (Hc: 800 Oe, BET value: 50 m$^2$/g) | 100 parts |
| Vinyl chloride type resin containing polar group (sulfo group) (MR-110, trade name, produced by Nihon Zeon K.K.) | 10 parts |
| Polyurethane resin containing polar group (sulfo group) (UR-8700, trade name, produced by Toyobo K.K.) | 5 parts |

-continued

| | |
|---|---|
| Stearic acid | 1 part |
| Myristic acid | 1 part |
| Butyl stearate | 1 part |
| Alumina (Al$_2$O$_3$) | 6 parts |
| Carbon black (average particle size: 40 mµ) | 0.8 part |
| Cyclohexanone | 150 parts |
| Methyl ethyl ketone | 50 parts |
| Toluene | 50 parts |

Next, to each of the magnetic coating for the upper layer and the magnetic coating for the lower layer obtained was added 5 parts of polyisocyanate (Colonate L, trade name, produced by Nippon Polyurethane Kogyo K.K.), respectively. Each coating was coated on a polyethylene terephthalate film having a thickness of 10 µm according to the wet-on-wet system, and then a magnetic field orientation processing was carried out while the coated film was wet. After drying the film, a surface smoothing treatment was carried out by calendering to form a magnetic layer consisting of a lower layer having a thickness of 2.6 µm and an upper layer having a thickness of 0.4 µm.

Further, on the surface (back surface) opposite to the surface coated with the magnetic layer of the above polyethylene terephthalate film was coated a coating having the following composition. The coated film was dried and calendered according to the calender conditions described below to form a back coat layer having a thickness of 0.8 µm, whereby a wide magnetic tape was obtained.

(Coating for back coat layer)

| | |
|---|---|
| Carbon black (Raven 1035, trade name produced by Columbian Carbon Japan, Ltd.) | 40 parts |
| Barium sulfate (average particle size: 300 mµ) | 10 parts |
| Nitrocellulose | 25 parts |
| Polyurethane type resin (N-2301, trade name, produced by Nippon Polyurethane K.K.) | 25 parts |
| Polyisocyanate compound (Colonate L, trade name, produced by Nippon Polyurethane K.K.) | 10 parts |
| Cyclohexanone | 400 parts |
| Methyl ethyl ketone | 250 parts |
| Toluene | 250 parts |

The raw fabric thus obtained was slit to prepare an 8 mm video tape.

The electromagnetic conversion characteristics, coatability and running durability of the video tape were measured according to the following manners. The results are shown in Table 2.

<RF output and chroma output>

The outputs were measured by using a noise meter 925C (trade name) manufactured by Shibasoku K.K. and an 8 mm video movie V900 (trade name, manufactured by Sony K.K.).

<Lumi S/N>

Signals of white 100% were inputted on the sample tape at a standard level, and the reproduced video signals were inputted to 921D/1 (trade name, a noise meter produced by Shibasoku K.K.). The lumi S/N was read from the absolute value of the noise obtained.

<Chroma S/N>

By using a noise meter manufactured by Shibasoku K.K., the S/N difference in chroma signals between the sample tape and a standard tape was determined.

<Running durability>

Under the conditions of a temperature of 40° C. and a relative humidity of 20% the full length of the video tape was run 50 times, and the edge damage of the tape after running was judged with visual observation.

The evaluation standard is shown below.

O: No edge break occurs

Δ: Partial edge break occurs

X: Full length of edge break occurs

Calender conditions

The calender conditions are shown in Table 1.

TABLE 1

| Calendar condition | Temperature (°C.) | Pressure (kg/cm$^2$) | C/s (m/min) |
|---|---|---|---|
| 1 | 80 | 300 | 30 |
| 2 | 70 | 250 | 30 |
| 3 | 70 | 200 | 50 |
| 4 | 60 | 200 | 50 |
| 5 | 60 | 150 | 50 |

<Surface roughness ($R_{10z}$)>

The surface roughness was measured by using a Talystep roughness meter (trade name, manufactured by Rank Taylor Hobson Co.).

The measurement conditions were a stylus of 2.5×0.1 µm, a stylus pressure of 2 mg, a cut-off filter of 0.33 Hz, a measuring rate of 2.5 µm/sec and a standard length of 0.5.

As to the roughness curve, unevenness of 0.002 µm or less was cut.

Examples 2 to 6

Films for a magnetic tape were prepared in the same manner as in Example 1 except for changing the film thickness of the upper layer and the film thickness of the lower layer as shown in Table 2, and various characteristics were measured. The results are shown in Table 2.

TABLE 2

| | Example 1 | Example 2 | Example 3 | Example 4 | Example 5 | Example 6 |
|---|---|---|---|---|---|---|
| Magnetic powder (upper layer) | Fe—Al | Fe—Al | Fe—Al | Fe—Al | Fe—Al | Fe—Al |
| Upper layer film thickness (µm) | 0.4 | 0.3 | 0.2 | 0.1 | 0.05 | 0.5 |
| Lower layer film thickness (µm) | 2.6 | 2.7 | 2.8 | 2.9 | 2.95 | 2.5 |
| Calendar condition | 1 | 1 | 1 | 1 | 1 | 1 |
| R10z (nm) | 20 | 20 | 21 | 21 | 23 | 19 |
| RF output | +2.0 | +1.9 | +1.7 | +1.5 | +0.8 | +2.2 |
| Lumi S/N | +1.8 | +1.8 | +1.6 | +1.4 | +0.7 | +2.0 |
| Chroma output | +2.8 | +2.9 | +3.0 | +3.0 | +3.1 | +2.1 |
| Chroma S/N | +2.7 | +2.9 | +2.9 | +3.0 | +2.8 | +1.9 |
| Running durability | o | o | o | o | o | o |

Examples 7 to 12

Films for a magnetic tape were prepared in the same manner as in Example 1 except for using Co—Zn substituted barium ferrite (Hc: 1,100 Oe, BET value: 45 m$^2$/g, $\sigma_s$: 64 emu/g, particle aspect ratio: 4) in place of the Fe—Al type ferromagnetic metallic powder in the uppermost layer in Example 1, and changing the film thickness of the upper layer and the film thickness of the lower layer as shown in Table 3, and various characteristics were measured. The results are shown in Table 3.

Examples 13 and 14

The procedures were carried out in the same manner as in Example 1 except for changing the calender conditions as shown in Table 3. The results are shown in Table 3.

Examples 15 and 16

The procedures were carried out in the same manner as in Example 7 except for changing the calender conditions as shown in Table 3. The results are shown in Table 3.

Example 17

The procedures were carried out in the same manner as in Example 1 except for providing an intermediate layer between the upper and lower layers. The conditions were the same as those in Example 1 except for using the lower layer composition in Example 1 in which a Co-y-Fe$_2$O$_3$ ferromagnetic powder had a BET value of 45 m$_2$ g and an Hc of 750 Oe in as an intermediate layer, and changing the film thicknesses of the upper, intermediate and lower layers to 0.3 μm, 0.4 μm and 2.3 μm, respectively. The results are shown in Table 3.

calender conditions as shown in Table 4. The results are shown in Table 4.

Comparative examples 3, 4, 7 and 8

The procedures were carried out in the same manner as in Example 7 except for changing the film thickness of the upper layer and the film thickness of the lower layer, and the calender conditions as shown in Table 4. The results are shown in Table 4.

TABLE 3

|  | Example 7 | Example 8 | Example 9 | Example 10 | Example 11 | Example 12 | Example 13 | Example 14 | Example 15 | Example 16 | Example 17 |
|---|---|---|---|---|---|---|---|---|---|---|---|
| Magnetic powder (upper layer) | Ba—Fe | Ba—Fe | Ba—Fe | Ba—Fe | Ba—Fe | Ba—Fe | Fe—Al | Fe—Al | Ba—Fe | Ba—Fe | Fe—Al |
| Upper layer film thickness (μm) | 0.4 | 0.3 | 0.2 | 0.1 | 0.05 | 0.5 | 0.4 | 0.4 | 0.4 | 0.4 | 0.3 |
| Lower layer film thickness (μm) | 2.6 | 2.7 | 2.8 | 2.9 | 2.95 | 2.5 | 2.6 | 2.6 | 2.6 | 2.6 | 0.4/2.3 |
| Calender condition | 1 | 1 | 1 | 1 | 1 | 1 | 2 | 3 | 2 | 3 | 1 |
| $R_{10z}$ (nm) | 18 | 18 | 17 | 17 | 20 | 18 | 36 | 48 | 34 | 47 | 19 |
| RF output | +2.6 | +2.5 | +2.3 | +1.9 | +1.5 | +2.7 | +1.2 | +0.7 | +1.6 | +1.0 | +2.2 |
| Lumi S/N | +2.4 | +2.4 | +2.1 | +1.7 | +1.4 | +2.5 | +0.9 | +0.5 | +1.3 | +1.0 | +2.2 |
| Chroma output | +2.1 | +2.0 | +2.2 | +2.2 | +2.2 | +1.6 | +2.4 | +1.9 | +1.8 | +1.4 | +2.8 |
| Chroma S/N | +2.3 | +2.4 | +2.5 | +2.5 | +2.3 | +1.4 | +1.8 | +0.9 | +1.6 | +0.8 | +2.9 |
| Running durability | ○ | ○ | ○ | ○ | ○ | ○ | ○ | ○ | ○ | ○ | ○ |

Comparative examples 1, 2, 5 and 6

The procedures were carried out in the same manner as in Example 1 except for changing the film thickness of the upper layer and the film thickness of the lower layer, and the

TABLE 4

| | Comparative examples | | | | | | | |
|---|---|---|---|---|---|---|---|---|
| | 1 | 2 | 3 | 4 | 5 | 6 | 7 | 8 |
| Magnetic powder (upper layer) | Fe—Al | Fe—Al | Ba—Fe | Ba—Fe | Fe—Al | Fe—Al | Ba—Fe | Ba—Fe |
| Upper layer film thickness (μm) | 0.6 | 1.0 | 0.6 | 1.0 | 0.4 | 0.4 | 0.4 | 0.4 |
| Lower layer film thickness (μm) | 2.4 | 2.0 | 2.4 | 2.0 | 2.6 | 2.6 | 2.6 | 2.6 |
| Calender condition | 1 | 1 | 1 | 1 | 4 | 5 | 4 | 4 |
| $R_{10z}$ (nm) | 19 | 19 | 18 | 17 | 52 | 61 | 53 | 52 |
| RF output | +2.0 | +2.0 | +2.6 | +2.7 | −0.1 | −1.2 | +0.1 | −0.9 |
| Lumi S/N | +1.9 | +2.0 | +2.5 | +2.5 | 0 | −0.9 | 0 | −0.7 |
| Chroma output | +1.9 | +0.3 | −0.3 | −4.3 | +1.7 | +1.5 | +1.1 | +0.8 |
| Chroma S/N | +1.4 | +1.1 | +0.6 | −1.2 | +0.3 | −1.8 | −0.7 | −2.4 |
| Running durability | Δ | Δ | Δ | Δ | Δ | Δ | Δ | Δ |

According to the present invention, there can be provided a magnetic recording medium having well-balanced video characteristics and chroma/audio characteristics, remarkably improved in electromagnetic conversion characteristics and also improved in running durability.

We claim:

1. A magnetic recording medium characterized in that plural magnetic layers are provided on a non-magnetic support, the uppermost layer of the magnetic layers contains a binder and a material selected from the group consisting of a ferromagnetic metallic powder, a hexagonal system magnetic powder and mixtures thereof, at least one layer other than the uppermost-layer contains Co-containing iron oxide and a binder, the film thickness of the uppermost layer is 0.5 μm or less, and the surface of the uppermost layer of the magnetic layers has an $R_{10z}$ value of the magnetic layer defined below of 50 nm or less, wherein $R_{10z}$ refers to a value obtained by measuring, in a long axis magnification direction of a surface outline curve, a distance between two straight lines which are a line passing the 10th peak from the highest and a line passing the 10th ravine from the lowest selected from lines parallel to a horizontal line cutting an upper surface outline curve contour lines at a cut surface, when a magnetic recording medium is cut to a longer direction vertically within an area of ±2 mm from the middle point of a width direction with a standard length of 0.5 mm.

2. The medium of claim 1 wherein the film thickness of the above uppermost layer is 0.1 to 0.4 μm.

3. The medium of claim 1 wherein said $R_{10z}$ value is 5 to 20 nm.

4. The medium of claim 1 wherein the ferromagnetic metallic powder is at least one selected from the group consisting of Fe and Co powders, Fe—Al type, Fe—Al—Ni type, Fe—Al—Zn— type, Fe—Al—Co type, Fe—Al—Co-type, Fe—Ni type, Fe—Ni—Al type, Fe—Ni—Co type, Fe—Ni—Si—Al—Mn type, Fe—Ni—Si—Al—Zn type, Fe—Al—Si type, Fe—Ni—Zn type, Fe—Ni—Mn type, Fe—Ni—Si.

5. The medium of claim 1 wherein the hexagonal system magnetic powder is at least one selected from the group consisting of barium ferrite and strontium ferrite in which a part of iron element may be substituted by Ti, Co, Zn In, Mn, Ge or Nb.

6. The medium of claim 1 wherein the Co-containing iron oxide is at least one selected from the group consisting of Co-doped —$Fe_2O_3$, Co-adsorbed —$Fe_2O_3$, $Fe_3O_4$, Co-doped $Fe_3O_4$, Co-adsorbed $Fe_3O_4$ and Co-adsorbed magnetic (wherein $4/3<x<3/2$).

7. The medium of claim 1 wherein the magnetic layers further contain an antistatic agent in an amount of 0.01 to 40% by weight based on a weight of said binder.

8. The medium of claim 1 wherein said binder has at least one polar group selected from the group consisting of —$SO_3M$, —$OSO_3M$, —$COOM$ and —$PO(OM^1)2$ wherein M represents hydrogen, Na, K, or Li, and $M^1$ represents hydrogen, Na, K, Li, or alkyl, and is present in an amount of 0.1 to 8.0 mole % based on said resin.

9. The medium of claim 4 wherein the ferromagnetic metallic powder has an average long axis length of less than 0.25 μm, a crystal size of less than 200 Å, a coercive force of 600 to 5,000 Oe, a saturation magnetization amount ($\sigma_s$) of 70 emu/g or more and a specific surface area measured by the BET method of 45 m²/g or more.

10. The medium of claim 5 wherein said barium ferrite has an average particle diameter of 300 to 900 Å, a particle aspect ratio of 2.0 to 10.0, a coercive force of 350 to 2,000 Oe, a saturation magnetization amount of at least 60 emu/g, and a specific surface area measured by the BET method of at least 30 m²/g.

11. The medium of claim 9 wherein the ferromagnetic metallic powder has an average long axis length of 0.10 to 0.22 μm and a crystal size of 100 to 180 521 .

* * * * *